United States Patent [19]

Kato et al.

[11] Patent Number: 5,371,769

[45] Date of Patent: Dec. 6, 1994

[54] FUEL ROD SUPPORT GRIDS FOR FUEL ASSEMBLY

[75] Inventors: Akihiro Kato; Kinichi Sugai; Hiroaki Kadono, all of Ibaraki; Masaji Mori, Kobe; Yasunao Yamaguchi, Tokyo; Atsushi Baba, Kobe; Toshiyuki Kawagoe, Tokyo; Masahiko Imaizumi, Ibaraki, all of Japan

[73] Assignees: Mitsubishi Nuclear Fuel Co.; Mitsubishi Genshiryoku Kogyo Kabushiki Kaisha, both of Tokyo, Japan

[21] Appl. No.: 87,900

[22] Filed: Jul. 9, 1993

[30] Foreign Application Priority Data

Jul. 10, 1992 [JP] Japan .................. 4-184195

[51] Int. Cl.$^5$ .............................................. G21C 3/34
[52] U.S. Cl. ..................... 376/442; 376/439
[58] Field of Search ........... 376/448, 439, 442, 462; 976/DIG. 78, DIG. 71

[56] References Cited

U.S. PATENT DOCUMENTS

| | | | |
|---|---|---|---|
| 3,379,617 | 4/1968 | Andrews et al. | 376/442 |
| 3,674,637 | 7/1972 | Anthony et al. | 376/442 |
| 3,679,546 | 7/1972 | Muellner et al. | |
| 3,686,071 | 8/1972 | Gaines . | |
| 3,833,471 | 9/1974 | Chetter | 376/442 |
| 3,920,515 | 11/1975 | Ferrari et al. | 376/442 |
| 4,077,843 | 3/1978 | Patterson et al. | 376/442 |
| 4,396,573 | 8/1983 | Feutrel | 376/442 |
| 4,594,216 | 6/1986 | Feutrel | 376/442 |
| 4,725,402 | 2/1988 | Krawiec . | |
| 4,839,136 | 6/1989 | DeMario | 376/462 |
| 4,879,090 | 11/1989 | Perrotti et al. | 376/462 |
| 4,885,127 | 12/1989 | Yokoyama | 376/462 |
| 5,139,736 | 8/1992 | Bryan | 376/442 |

FOREIGN PATENT DOCUMENTS 2132705 11/1972 France .
2352373 12/1977 France .

Primary Examiner—Donald P. Walsh
Assistant Examiner—Meena Chelliah
Attorney, Agent, or Firm—Oblon, Spivak, McClelland, Maier & Neustadt

[57] ABSTRACT

A grid structure is presented in which grid cells are formed by orthogonally intersecting straps prefitted in the longitudinal direction with a plurality of slitted spring frame members. Therefore, when the straps are assembled, the spring frame members are also orthogonally intersected. The spring frame members are made of Inconel and provided with welding tabs while the straps are made of zircalloy and provided with their own welding tabs. Therefore, welding can be performed to firmly join the spring frame members to each other while the straps can also be welded firmly to weld the like metals. The spring sections are thus firmly joined and attached to the straps which are firmly joined. The grid of this configuration thus provides an excellent service life without the losing The fuel rod retaining power, which would result from neutron radiation and thermal damages on holding devices made of zircalloy.

12 Claims, 2 Drawing Sheets

FUEL ROD SUPPORT GRIDS FOR FUEL ASSEMBLY

BACKGROUND OF THE INVENTION

1. Field of the Invention

The present invention relates to a fuel rod support grid in which straps and springs are made of different materials.

2. Technological Background

A fuel assembly of the following construction is generally known. In a typical fuel assembly, a plurality of support grids are disposed at a predetermined spacing between the upper nozzle and the lower nozzle. A grid comprises a plurality of straps intersecting at right angles to each other thereby defining a plurality of grid cells. In the grid cells are disposed a control rod guide tube and instrument tubes which are retained by the grid and whose ends are attached to the upper and lower nozzles. A plurality of fuel rods pass through the grid cells, in which each rod is elastically retained in the grid cell by the springs joined to the straps of the grids.

In the conventional technology presented above, the material of construction of the grid is Inconel (nickel alloys for use in nuclear reactors) which provide excellent elastic properties. However, it is desirable to make the grid with zircalloy (zirconium alloys), in view of improving the neutron economy and lowering the exposure to neutron irradiation. However, the use of zircalloy alloys for the springs presented problems in that this material, which is inherently not highly elastic, is prone to degradation after neutron irradiation. Therefore, zircalloy springs are inferior in performance to Inconel springs.

A solution to the above problem which has been under consideration is to use zircalloy for the straps, and Inconel for the springs. A problem in this combination of different materials for making a grid is that when the straps and springs are made of different materials, welding cannot be used for joining the straps to springs. Therefore, there has been an outstanding need to develop a grid configuration in which the springs are firmly joined to the straps, the joint structure is relatively simple and grid manufacturing is facilitated.

SUMMARY OF THE INVENTION

The present invention relates to a fuel rod support grid (hereinafter referred to as grid) and an objective is to present a grid configuration of a relatively simple structure which can be manufactured readily, so that the straps are engaged firmly with the springs, the neutron economy is improved, the exposure to neutron irradiation is reduced, and the elastic characteristics of the springs are maintained during the service life.

Another objective of the present invention is to present a grid configuration which enables welding to be applied to join the same metals even though the straps and the springs are made from different metals.

Yet another objective of the present invention is to present a grid having a structure which prevents thermal effects of welding of the spring frame members to adversely affect the performance of the straps.

According to an aspect of the present invention, there is provided a fuel rod support grid for nuclear fuel assembly, the grid defining grid cells for holding fuel rods, said grid comprising: a plurality of straps intersecting each other thereby constituting a grid, the straps having a plurality of bosses; a plurality of spring frame members engaged with the straps and intersecting each other thereby constituting a grid, said spring frame members having a plurality of spring sections disposed in a direction perpendicular to the longitudinal direction of the fuel rods; wherein each of the fuel rods is resiliently held in each of the grid cell by the bosses and said spring sections.

In the grid of such a configuration, fuel rods are retained in the grid cells with mutually crossing spring frame members engaged with the straps in the horizontal direction. The spring frame members themselves support each other firmly and the mutually orthogonal spring frame members are attached firmly to the straps.

The grid cell configuration of the present invention thus allows engaging of the spring frame members smoothly but firmly with the straps. Furthermore, since the straps and the spring frame members are made of different materials, it provides advantages in neutron economy and lowering of neutron exposure, thereby enabling the maintaining of the spring properties for an extended period of time. The construction is relatively simple, and thus facilitates the manufacturing of the grids.

PREFERRED EMBODIMENT OF THE INVENTION

Figure 1:
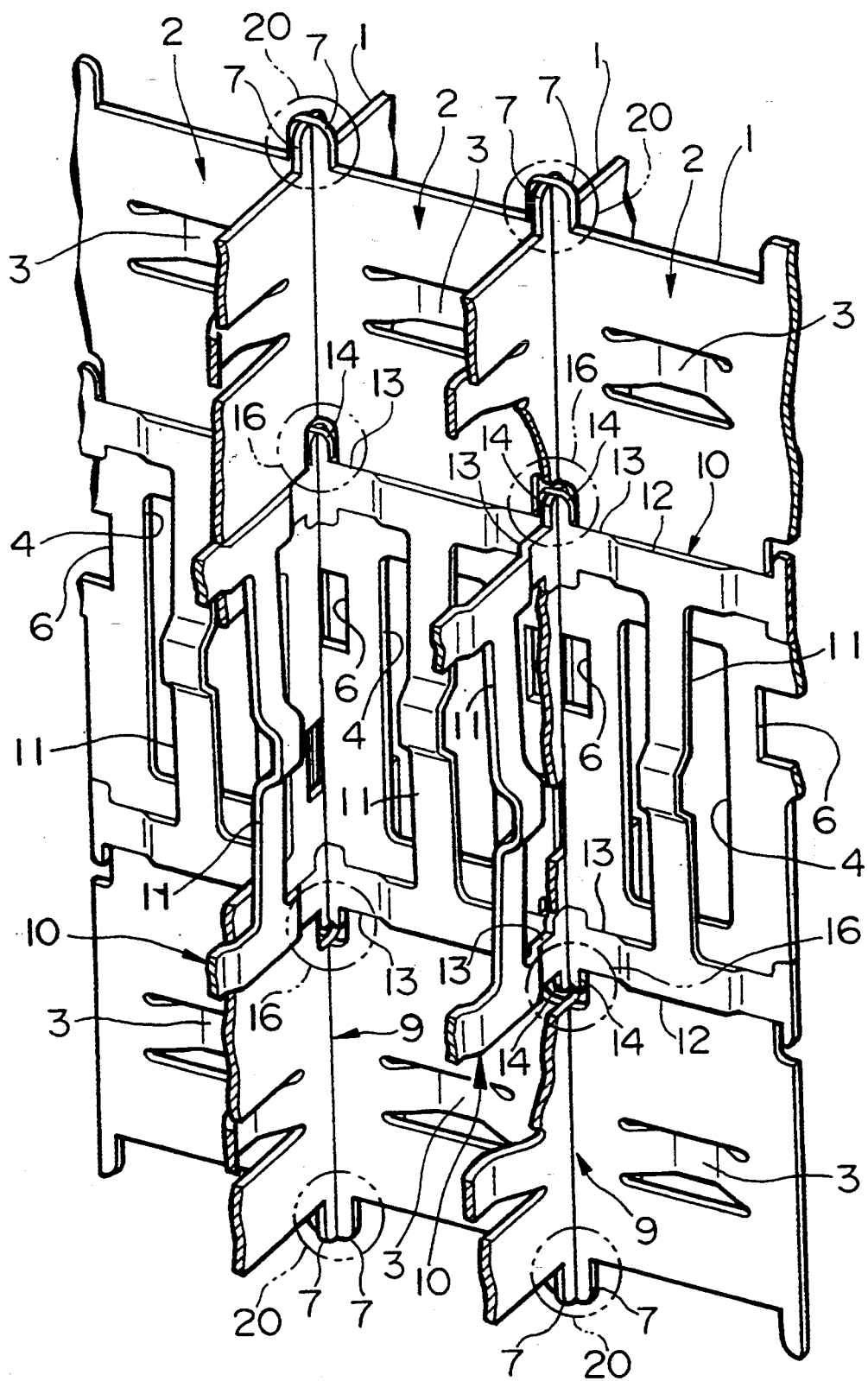
FIG. 1 is a perspective view of the essential parts of a partially assembled grid of an embodiment of the present invention.

An embodiment of the present invention will be explained with reference to FIGS. 1 and 2.

In these figures, the reference numeral 1 refers to straps of a thin strip form made of zircalloy. A large number of grid cells 2 of the grids are formed by cross assembling the straps 1 with each other. A plurality of bosses 3, arranged in rows and projecting out of one wall of the grid cells 2, are formed on both ends (the top and bottom ends in FIG. 1) of the straps 1.

In the spaces between the two columns of bosses 3 are disposed rectangular-shaped central windows 4. As shown in FIG. 2, punch-out windows 5 (window sections) of a cross shape, consisting of an interlock section 5a and a recess section 5b at right angles to each other, are formed above and below and between the central windows 4. Near the center region of the strap 1, a series of through holes 6 of roughly rectangular shape are formed on the extension line joining the vertical pairs of window sections 5. At the top and bottom edges of the straps 1 on the extension line joining the vertical pairs of window sections 5 are disposed a series of vertical pairs of strap welding tabs 7.

Figure 2:
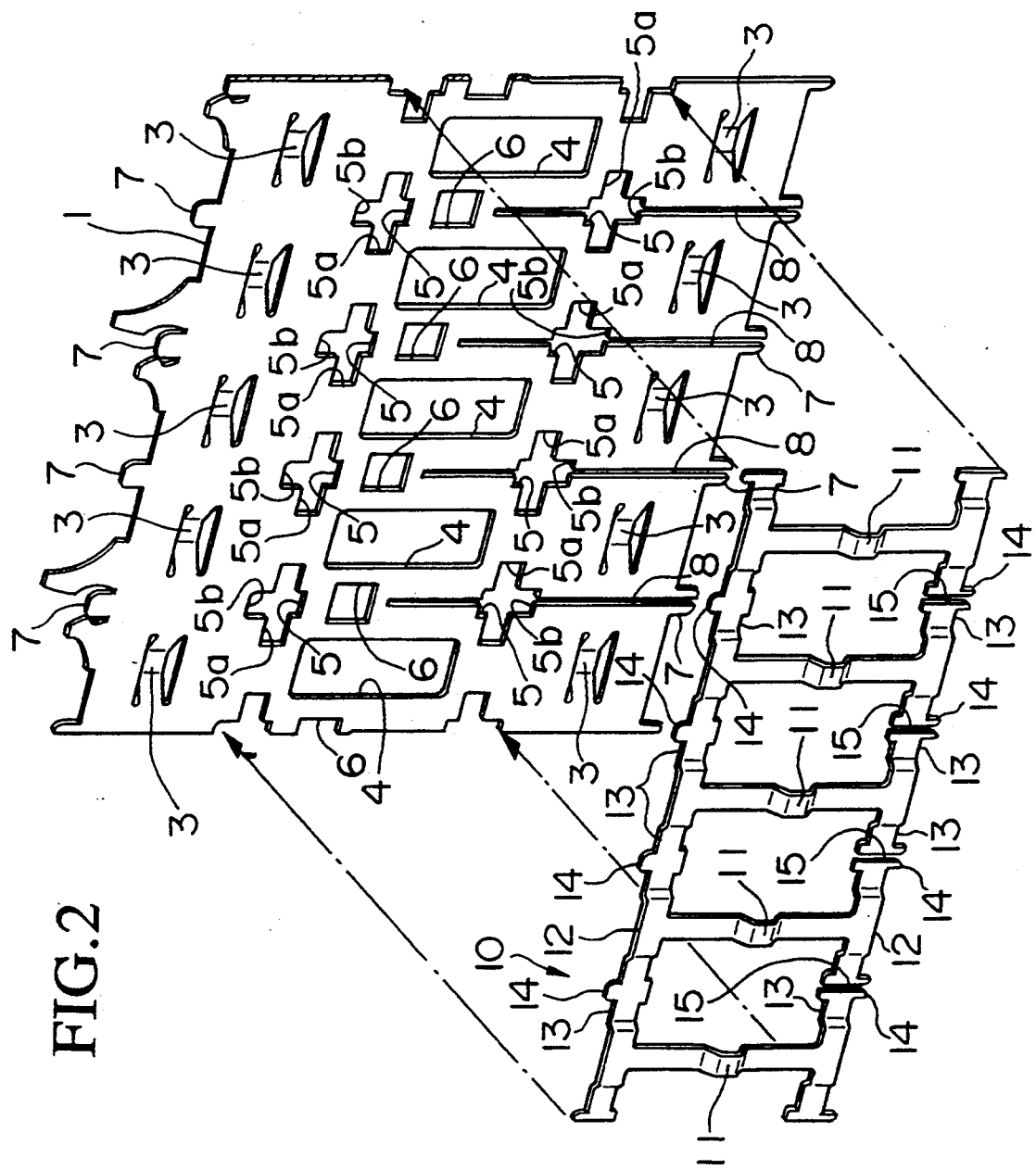
FIG. 2 is an exploded perspective view of the unassembled straps and a spring frame member of the grids shown in FIG. 1.

With regard to the first type of strap 1 as shown in FIG. 2, on one edge (i.e., the bottom strap welding tabs 7 and window sections 5 in FIG. 2) of the strap 1 is formed a series of slits 8 which start at the bottom strap welding tab 7 and pass through the lower window section 5 to reach the center region of the strap 1. The second type of the strap 1 has the same configuration as the first type except that a series of slits are formed from the top strap welding tab 7. When the first and second types of straps 1 are assembled at right angles by inserting each other at the slits 8, the intersections 9 are formed as shown in FIG. 1. A ladder-like spring frame member 10 made of Inconel is engaged with strap 1 by engaging at window sections 5 formed on the straps 1.

The spring frame member 10 is disposed on the strap 1 at a height of central windows 4, and comprise: spring sections 11 jutting out oppositely to the bulging direction of the bosses 3; and a pair of connecting plate sections 12 which connect to the top and bottom sections of the spring section 11. Protrusion sections 13 which protrude in the opposite direction to the spring section 11 are formed on the connecting plate section 12 to be engaged with the interlock section 5a of the window section 5. Further, vertically opposing pairs of frame member welding tabs 14 are formed at the top and the bottom edges of the spring frame member 10.

With regard to the first type of the spring frame member shown in FIG. 2, lower horizontal frame member welding tabs 14 are provided with slits 15. The second type of the spring frame member (not shown) is provided with slits at upper horizontal frame member welding tabs 14. When the first and second spring frame members are assembled, they are inserted to each other through the slits 15. The frame member welding tabs 14 are assembled with each other at right angles by inserting through the slits 15, a welding section 16 is formed at the intersection of the frame member welding tabs 14, as illustrated in FIG. 1. The welding section 16 is housed in the over-sized recess section of the window section 5 so as to prevent adverse thermal effects on the strap 1 during the welding operation of spring frame members 10.

The method of constructing a grid using the strap configuration presented above will be explained with reference to FIG. 2. First, the spring frame members 10 are attached to the strap 1 by engaging the protrusion sections 13 of the spring frame members 10 in each interlock section 5a of the two rows of window sections 5. The straps 1 with the spring frame members 10 attached thereto are then cross-inserted through the slits 8 to construct a temporary structure shown in FIG. 1.

Next, the strap welding tabs 7 crossing at the intersections 9 of the straps 1 are laser welded (exemplified by reference numeral 20 in FIG. 1), and the frame member welding tabs 14 of the spring frame member crossing at the welding section 16 are similarly laser welded. In this way, the grid assembly structure itself is constructed with the mutually crossing straps 1 made of zircalloy, while only the spring sections 11 formed with mutually crossing spring frame members 10 made of Inconel are disposed inside the grind 2.

Before loading fuel rods into the grids of the above construction, keys (not illustrated) are inserted thorough the through hole 6 horizontally into the grid cells 2 to press open the spring section 11, then fuel rods can be slid in the grid cells 2 without interference from the springs. Thenafter, the keys are removed to return the spring section 11 to the original position and retain the fuel rods with the spring sections 11 and the bosses 3.

What is claimed is:

1. A fuel rod support grid for nuclear fuel assemblies, said support grid defining grid cells for holding fuel rods, said support grid comprising:
   a plurality of straps intersecting each other to thereby constitute a grid, each of said straps having a plurality of bosses and being provided with a plurality of window sections disposed in a longitudinal direction thereof at a predetermined spacing; and
   a plurality of spring frame members, each of said plurality of spring frame members being previously engaged with each of said straps and intersecting with each other to thereby constitute another grid, each of said spring frame members having a plurality of spring sections disposed in a longitudinal direction thereof and being provided with a plurality of protrusion sections disposed in a longitudinal direction thereon at a predetermined spacing for respectively engaging with said window sections of the straps, and each of said protrusion sections respectively having frame member welding tabs so as to leave a spacing in said window sections when said protrusion sections are engaged in said window sections, wherein said frame member welding tabs are orthogonal to each other and firmly welded;
   wherein each of said fuel rods is resiliently held in each of said grid cells by said bosses and said spring sections.

2. A fuel rod support grid as claimed in claim 1, wherein each of said plurality of straps is provided with a plurality of mutually orthogonal strap welding tabs which are firmly joined.

3. A fuel rod support grid as claimed in claim 1, wherein each of said spring frame members has a ladder-like structure formed by a pair of connecting plate sections extending parallelly in a direction perpendicular to said longitudinal direction of said fuel rods, and said protrusion section and said frame member welding tabs are formed on said connecting plate sections between adjacent pairs of said spring sections.

4. A fuel rod support grid as claimed in claim 2, wherein each strap is provided with central windows at a location to correspond with each of said spring sections of said spring frame members.

5. A fuel rod support grid as claimed in claim 2, wherein said plurality of said strap welding tabs face each other across a direction transverse to a longitudinal direction of said fuel rods, and said window sections face each other across said transverse direction, wherein each of said strap welding tabs and said window sections disposed on one side of said transverse direction is provided with a slit.

6. A fuel rod support grid as claimed in claim 3, wherein said frame member welding tabs face each other across a direction transverse to a longitudinal direction of said fuel rods, and said protrusion sections face each other across said transverse direction, wherein each of said frame member welding tabs and said protrusion sections disposed on one side of said transverse direction is provided with a slit.

7. A fuel rod support grid as claimed in claim 1, wherein each of said straps is made of zircalloy, and each of said spring frame members is made of Inconel.

8. A fuel rod support grid as claimed in claim 4, wherein each of said straps is made of zircalloy, and each of said spring frame members is made of Inconel.

9. A fuel rod support grid as claimed in claim 5, wherein each of said straps is made of zircalloy, and each of said spring frame members is made of Inconel.

10. A support grid as claimed in claim 6, wherein each of said straps is made of zircalloy, and each of said spring frame members is made of Inconel.

11. A support grid as claimed in claim 2, wherein each of said straps is made of zircalloy, and each of said spring frame members is made of Inconel.

12. A support grid as claimed in claim 3, wherein each of said straps is made of zircalloy, and each of said spring frame members is made of Inconel.

* * * * *